(No Model.) 2 Sheets—Sheet 2.
P. McCAULEY.
PIPE HOLDER.
No. 406,849. Patented July 9, 1889.
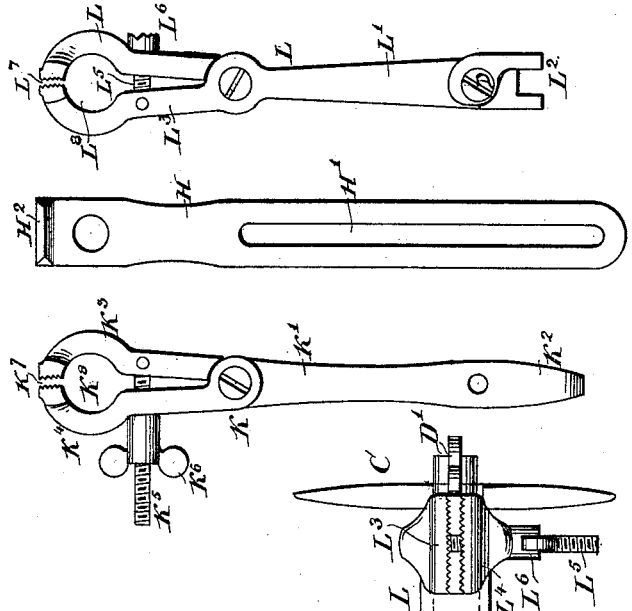
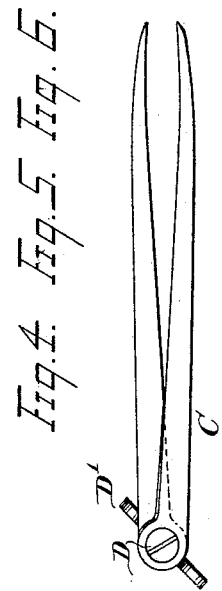
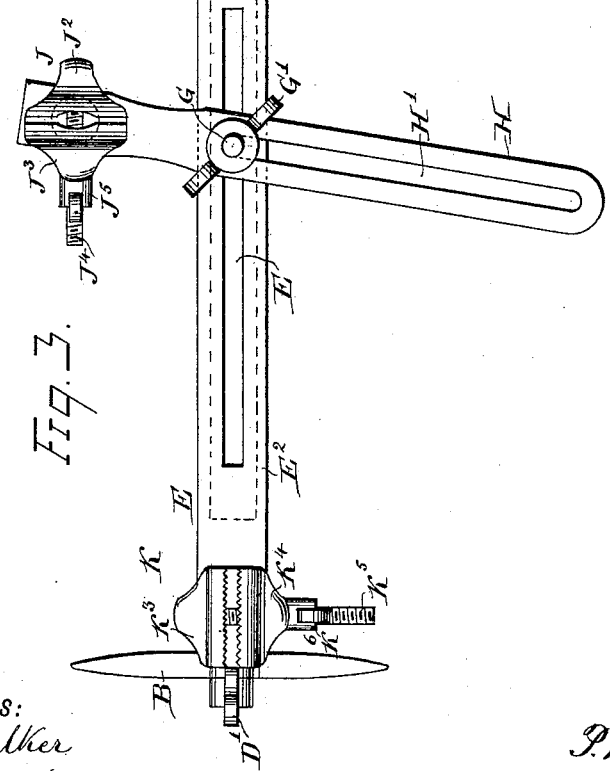
WITNESSES:
H. Walker
C. Sedgwick
INVENTOR:
P. McCauley
BY
Munn &
ATTORNEYS.

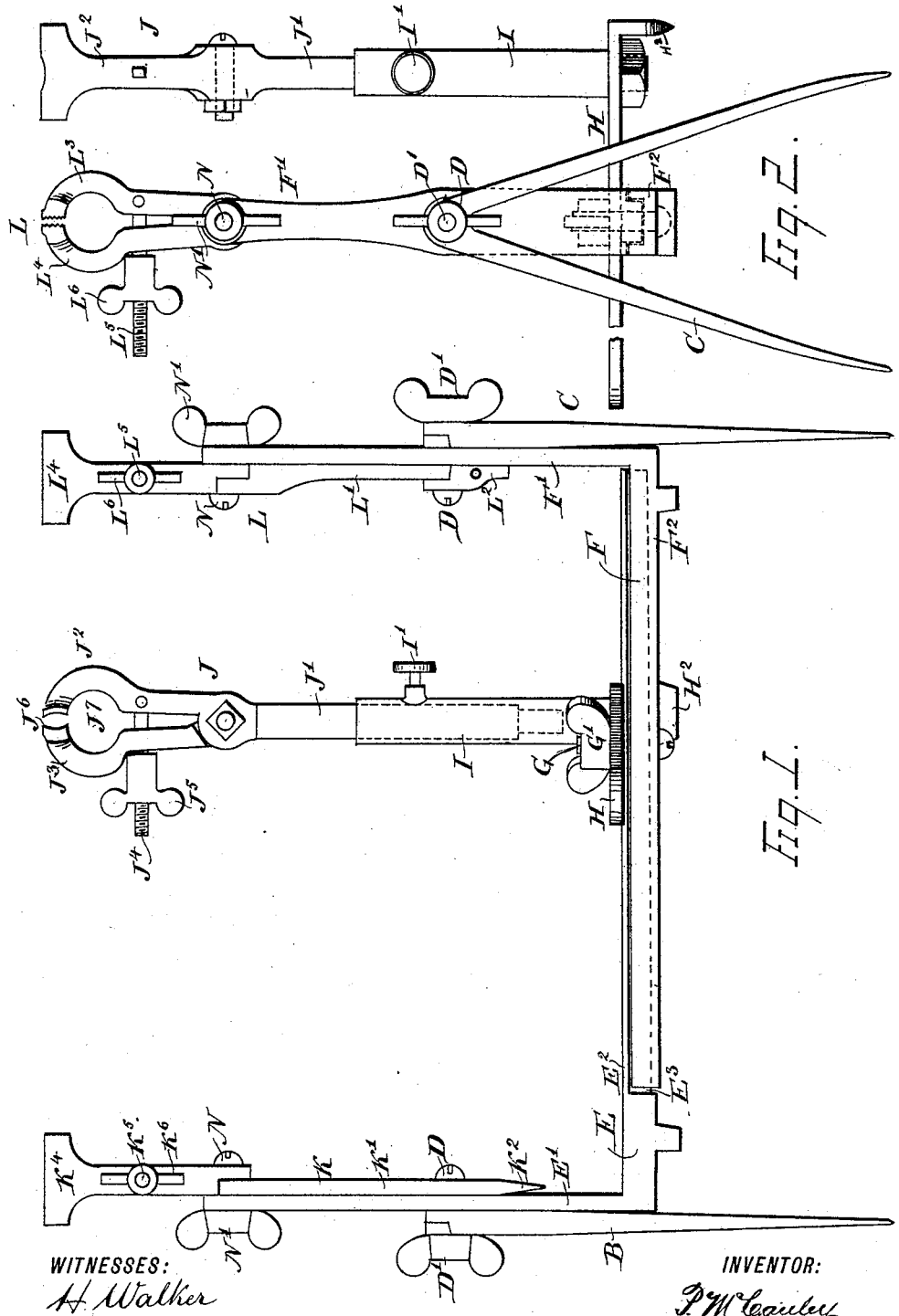

UNITED STATES PATENT OFFICE.

PATRICK McCAULEY, OF BRADDOCK, PENNSYLVANIA.

PIPE-HOLDER.

SPECIFICATION forming part of Letters Patent No. 406,849, dated July 9, 1889.

Application filed April 13, 1889. Serial No. 307,115. (No model.)

*To all whom it may concern:*

Be it known that I, PATRICK McCAULEY, of Braddock, in the county of Allegheny and State of Pennsylvania, have invented a new and Improved Pipe-Holder, of which the following is a full, clear, and exact description.

The invention relates to tools used by plumbers and other artisans, and serving to hold lead pipes in place while operating on the same.

The object of the invention is to provide a new and improved pipe-holder which is simple and durable in construction and securely holds one, two, or more pipes and faucets, &c., in place in any desired position while forming the joints between the several parts held.

The invention consists of certain parts and details and combinations of the same, as will be hereinafter described, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is an end view of the same. Fig. 3 is a plan view of the same. Fig. 4 is a side elevation of one of the pipe-clamps with a screw-driver attached. Fig. 5 is an inverted plan view of one of the clamp-supporting arms. Fig. 6 is a side elevation of one of the pipe-clamps with a wrench attached, and Fig. 7 is an elevation of one of the frame caliper-legs.

The improved pipe-holder is provided with a frame having the legs B and C supporting the arms E and F, respectively. Each of the legs B and C is formed by a pair of calipers of any desired shape, having their pivotal joint formed by a screw D, which secures the leg to the respective arm $E'$ or $F'$ of the frame-arms E and F. On the outer end of the bolt D screws a winged nut $D'$, for securely clamping the arms of the calipers in place after they have been adjusted. At the same time said screw D and winged nut $D'$ fasten the leg B or C to the respective arm E or F. Each of the latter is L-shaped, having the vertical arm $E'$ or $F'$, respectively, and the horizontal arm $E^2$ or $F^2$, respectively, passing over each other, as is plainly shown in Figs. 2 and 3.

On the under side of the arm $E^2$ is formed a tongue $E^3$, which fits into a corresponding groove in the body of the arm $F^2$. A bolt G is screwed in the middle of the arm $F^2$ and passes through a slot $E^4$ in the other arm $E^2$, so that the two arms E and F may be moved apart any desired distance, and then secured together by a winged nut $G'$, screwing on the bolt G. The latter also passes through a slot $H'$ in a transversely-extending arm H, held on top of the arm $E^2$. The three arms $F^2, E^2$, and H are secured in place by the winged nut $G'$, screwing on the said bolt G. When the winged nut $G'$ is loosened, the arms $F^2$ and $E^2$ may be drawn apart, as before mentioned, and the arm H may be moved to any desired position, and then the three arms may be secured in place by the winged nut being screwed up on top of the arm H.

On the outer end of the arm H is secured an upwardly-extending pipe I, in which telescopes the shank $J'$ of a vise J, adapted to be raised or lowered in the said pipe I and secured in place on the same by a set-screw $I'$. The vise J is provided with the usual fixed jaw $J^2$ and the jaw $J^3$, pivoted on the said fixed jaw $J^2$. The pivoted jaw $J^3$ is opened or closed by a bolt $J^4$ and a winged nut $J^5$, screwing on the said bolt and against the said pivoted jaw $J^3$. The upper ends of the jaws $J^2$ and $J^3$ are formed into the usual grippers $J^6$ for holding any desired article in place. The said jaws are also curved to form a circular opening $J^7$ for the passage of the pipe to be held in place.

On the upright parts $E'$ and $F'$ of the arms E and F, respectively, are held the vises K and L, each provided with a shank $K'$ or $L'$, secured in place on the said arm parts $E'$ and $F'$ by the bolts D and by other bolts N, passing through the respective shanks and through the arm parts $E'$ and $F'$, respectively. Each of the bolts N is provided with a winged nut $N'$ for securely screwing the several parts together. The lower end of the shank $K'$ is formed into a screw-driver $K^2$, while the lower end of the shank $L'$ is formed into a wrench $L^2$.

The vises K and L are each provided with fixed jaws $K^3$ and $L^3$, and the pivoted jaws $K^4$ and $L^4$, respectively, are moved toward the fixed jaws by the bolts $K^5$ and $L^5$, respectively, and the winged nuts $K^6$ and $L^6$, respectively, in a manner similar to that described previously with reference to the vise J. The upper curved ends of the jaws of the vises K and L are provided with the usual gripping ends K⁷ and L⁷, respectively, and they also form circular openings K⁸ and L⁸, respectively, for the passage of the pipes to be held in place.

On the under side of the arm H is formed an offset H², having knife-edge, and serving for cutting metal parts in two.

When the several parts are detached, as illustrated in Figs. 4, 5, 6, and 7, then the vise K may be used in the ordinary manner as a vise, but it may also be used as a screw-driver. The vise L, when detached, is also used as an ordinary vise, but may be employed as a wrench. The legs C and B, when detached from the frame A, can be used as a pair of dividers or calipers, and the arm H, when detached, can be used for cutting metal by means of its knife-edged offset H².

When the several parts are fitted together, as illustrated in Figs. 1, 2, and 3, then the frame A can be set in any desired position by adjusting the arms of the legs B and C. As the latter are pointed, the frame may be driven into any soft material in any desired position, and thus held in place.

When the operator desires to form a joint between two pipes, he clamps one pipe in the circular opening of the vise K and the other in the circular opening of the vise L, so that the two ends of the pipes are securely held in place and are near each other in order to form the joint in the usual manner. When a third pipe is to be attached to the joint, it is clamped in the vise J, which is raised or lowered in the pipe I to the correct position.

If it is desired to attach a faucet to a pipe held by the vises K and L, said faucet is fastened in the vise J and placed in the proper position by adjusting the rod H, so that the inner end of the faucet is in contact with the joint in which it is to be secured.

The device may be used for quite a number of other purposes besides those just mentioned.

It will be understood that the several parts can be very easily and quickly taken apart in order to be folded up and carried in a bag without being bulky.

Having thus fully described my invention, I claim as new and desire to secure by Letters Patent—

1. A pipe-holder comprising a frame, calipers detachably secured to the ends of the frame and forming legs, and a vise at each end of the frame, substantially as described.

2. A pipe-holder comprising a frame, calipers detachably secured to the ends of the frame and forming legs, and vises having shanks and detachably secured to the ends of the frame, the shank of one vise being formed with a screw-driver and the shank of the other with a wrench, substantially as described.

3. A pipe-holder comprising an adjustable frame, calipers detachably secured to the ends of the frame and forming legs, a vise secured to each end of the frame, each vise being provided with a shank, one of which is formed with a screw-driver and the other a wrench, an arm adjustably secured to the frame and formed with a cutter, and a third vise adjustably supported by said arm, substantially as herein shown and described.

4. In a pipe-holder, the combination, with two L-shaped arms held adjustably one on the other, of two pairs of calipers pivoted on the said arms and forming a frame with the same, and vises secured on the said L-shaped arms, substantially as shown and described.

5. In a pipe-holder, the combination, with two L-shaped arms held adjustably one on the other, of two pairs of calipers pivoted on the said arms and forming a frame with the same, vises secured on the said L-shaped arms, a slotted arm held adjustably on the said frame, a pipe secured on the said arm, and a third vise held vertically adjustable in the said pipe, substantially as shown and described.

PATRICK McCAULEY.

Witnesses:
W. A. HOLLAND,
J. N. GRIFITH.